United States Patent

Hino et al.

[11] B 3,964,101
[45] June 15, 1976

[54] MAGNETIC RECORDING DISC

[75] Inventors: Tetsuo Hino, Osaka; Susumu Hashiguchi, Izumi, both of Japan

[73] Assignee: Matsushita Electric Industrial Co., Ltd., Osaka, Japan

[22] Filed: June 15, 1973

[21] Appl. No.: 370,453

[44] Published under the Trial Voluntary Protest Program on January 28, 1975 as document no. B 370,453.

[30] Foreign Application Priority Data

June 20, 1972 Japan............................ 47-62230
June 20, 1972 Japan............................ 47-62231
June 20, 1972 Japan............................ 47-62233

[52] U.S. Cl. ................................................. 360/99
[51] Int. Cl. ........................................ G11b 5/16
[58] Field of Search.................... 346/137; 274/41.4; 179/100.2 A, 100.2 P; 340/174.1 E, 174.1 C; 360/99

[56] References Cited
UNITED STATES PATENTS

| | | | |
|---|---|---|---|
| 3,212,075 | 10/1965 | Damerao et al. ............ | 179/100.2 A |
| 3,417,389 | 12/1968 | Dike ............................. | 179/100.2 A |
| 3,488,646 | 1/1970 | Sugaye et al. ................. | 179/100.2 A |
| 3,537,083 | 10/1970 | Voth ............................. | 179/100.2 A |
| 3,646,533 | 2/1972 | Rosenblum .................... | 179/100.2 A |
| 3,696,350 | 10/1972 | Cohen et al. .................. | 360/99 |
| 3,729,720 | 4/1973 | Darling et al. ................. | 179/100.2 A |
| 3,731,292 | 5/1973 | Kelley ........................... | 179/100.2 A |
| 3,751,598 | 8/1973 | Muraokz ....................... | 179/100.2 A |

*Primary Examiner*—Vincent P. Canney
*Attorney, Agent, or Firm*—Wenderoth, Lind and Ponack

[57] ABSTRACT

A magnetic recording disc is made up for a rotating disc, a flexible sheet mounted on the rotating disc, a magnetic sheet carried by the flexible sheet for recording and reproducing signals by a magnetic head, and a holding means.

The rotating disc has a first surface and a second surface indented from the first surface. The magnetic sheet is held, together with the flexible sheet, on the first surface of the rotating disc by the holding means. The magnetic head is in close contact with the magnetic sheet over the second surface with the aid of the flexible sheet mounted on the rotating disc.

6 Claims, 6 Drawing Figures

MAGNETIC RECORDING DISC

BACKGROUND OF THE INVENTION

This invention relates to a magnetic recording disc, and more particularly to a magnetic recording disc in which a magnetic sheet for recording and reproducing electric signals is easily held on a rotating disc and is stably in contact with a magnetic head.

Recently, a disc has been widely used as a magnetic recording medium for a memory device for digital information, video signals or the like. Conventional discs for magnetic recording are very expensive because it is necessary that the surface of the magnetic recording disc be finished and kept perfectly flat in order to get good recording results. Moreover, maintenance of the magnetic recording disc is very troublesome, and it is difficult to replace the recording disc by a new one while maintaining the flatness of the surface of the disc.

Therefore, it has been desired to develop a magnetic recording disc in which the magnetic recording medium can be kept perfectly flat, which has a simple construction and is easy to maintain. Particularly, when a magnetic recording disc is used for recording and reproducing electric signals at different rotating speeds of the disc, it is necessary that there be no difference in the magnetic head pressure with respect to the magnetic sheet.

Recently, we proposed a novel and improved magnetic recording disc in a prior patent application entitled "Magnetic Recording Disc," Ser. No. 273,967, which was filed on July 21, 1972, now U.S. Pat. No. 3,805,292 for fulfilling such requirements. The present invention relates to a further improvement of the magnetic recording disc of the above mentioned application.

SUMMARY OF THE INVENTION

An object of the present invention is to provide a novel and improved magnetic recording disc in which a magnetic recording medium is held perfectly flat on a rotating disc even when the rotating disc rotates at a high rotating speed or a low rotating speed so as to cause no degradation of electric signals recorded thereon or reproduced therefrom.

Another object of the invention is to provide an improved magnetic recording disc which is easy to maintain and in which the used magnetic recording medium can be easily replaced by a new one while maintaining the flatness thereof.

A further object of the invention is to provide an improved magnetic recording disc in which the magnetic recording medium is carried on a flexible sheet and a part of the magnetic recording medium, on which the electric signals are recorded or from which they are reproduced, can be in close contact with a magnetic head during operation of the recording disc, and further the magnetic sheet and the flexible sheet can be replaced easily.

These objects are achieved by a magnetic recording disc according to the invention, which comprises a rotating disc adapted to be rotated by a driving means, a flexible sheet mounted on the rotating disc, a magnetic sheet carried by the flexible sheet and on which electric signals are recorded and from which they are reproduced by a magnetic head, and a holding means. The rotating disc has a first surface and a second surface indented from the first surface. The magnetic sheet is held, together with the flexible sheet, on the first surface of the rotating disc by the holding means so that a part of the magnetic sheet over the second surface is in close contact with the magnetic head with the aid of the flexible sheet mounted on the rotating disc during the recording and reproducing operations.

BRIEF DESCRIPTION OF THE DRAWINGS

These and other objects and features and advantages of the present invention will be better understood by reference to the following description when considered in connection with the accompanying drawings wherein.

DETAILED DESCRIPTION OF THE INVENTION

Figure 1:
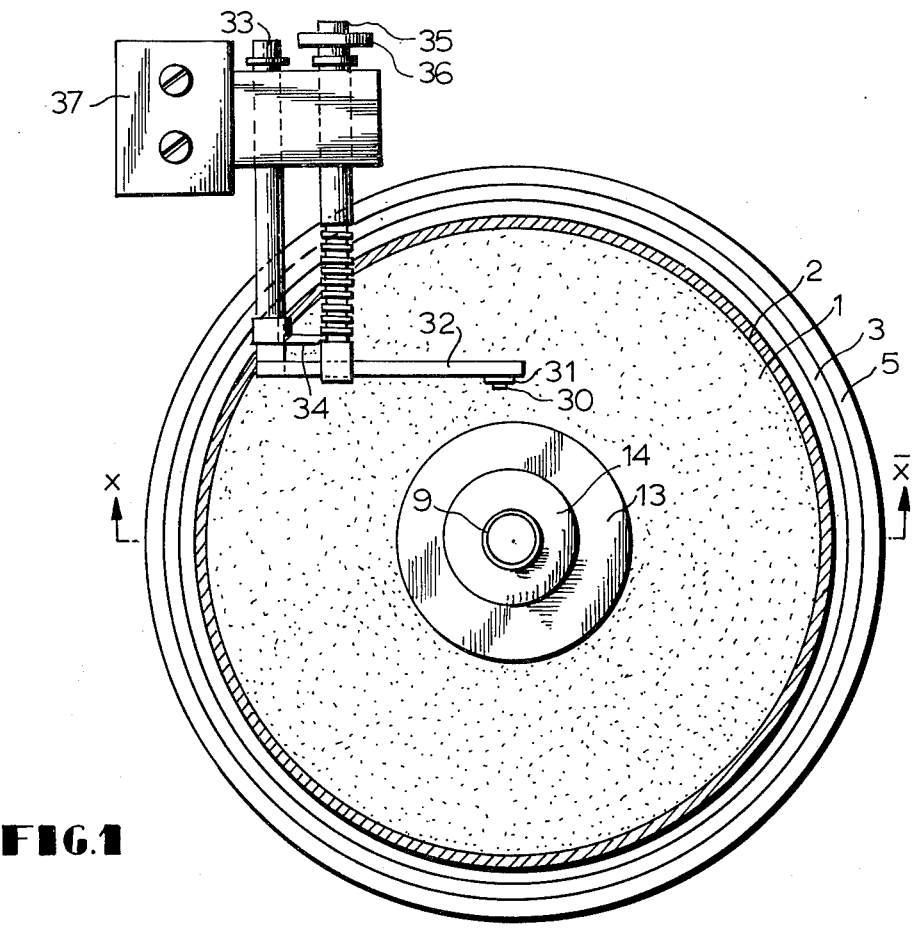
FIG. 1 is a plan view of one form of a magnetic recording disc according to this invention.
Figure 2:
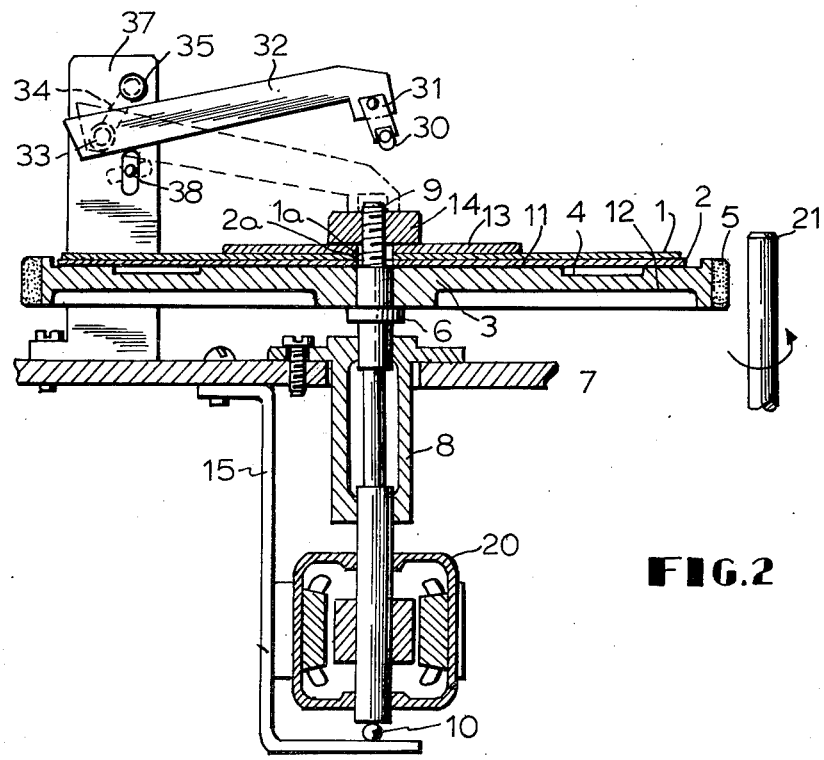
FIG. 2 is a cross-sectional view taken along the line x-$\bar{x}$ of FIG. 1 and viewed in the direction of the arrows.

Referring now to FIGS. 1 and 2, the construction of one form of a magnetic recording disc according to the invention will be described.

A magnetic sheet designated by a reference numeral 1 on which signals are recorded and from which signals are reproduced by a magnetic head 30 is in the form of a thin and flexible disc, and the center thereof is cut out to provide a hole 1a. A flexible sheet 2 is formed in the shape of a thin disc and it has a suitable elasticity so that when the magnetic sheet 1 is placed thereon it will contact the magnetic head 30 well. The center of the flexible sheet 2 is also cut out to provide a hole 2a. A rotating disc 3 has first surface portions 11 and 12, on which the magnetic sheet 1 and the flexible sheet 2 are to be placed, and a second surface 4 indented a slight distance from the first surface. The depth of the second surface below the first surface may be from scores of microns to a few hundred microns.

A shaft 6 passes through the rotating disc 3 at the center thereof, and is rotatably held by a bearing 8 fixed on a deck 7. A top part 9 of the shaft 6 projecting through the rotating disc 3 is threaded and is used as a clamp pole. The bottom of the shaft 6 is supported on a plate 15 by a rotatable steel ball 10 so that the rotating disc 3 can be smoothly rotated by a driving means.

A motor 20 directly coupled to the shaft 6 may be used for driving the rotating disc 3 at a high speed. In addition a capstan 21 placed at the periphery of the rotating disc 3 can be used for driving the rotating disc 3 at a low speed. The periphery of the rotating disc 3 is covered with an elastic material 5 so as to prevent slippage between the capstan 21 and the periphery of the rotating disc 3.

The following is a description of how the main parts of the magnetic recording disc shown in FIGS. 1 and 2 are assembled.

Figure 3:
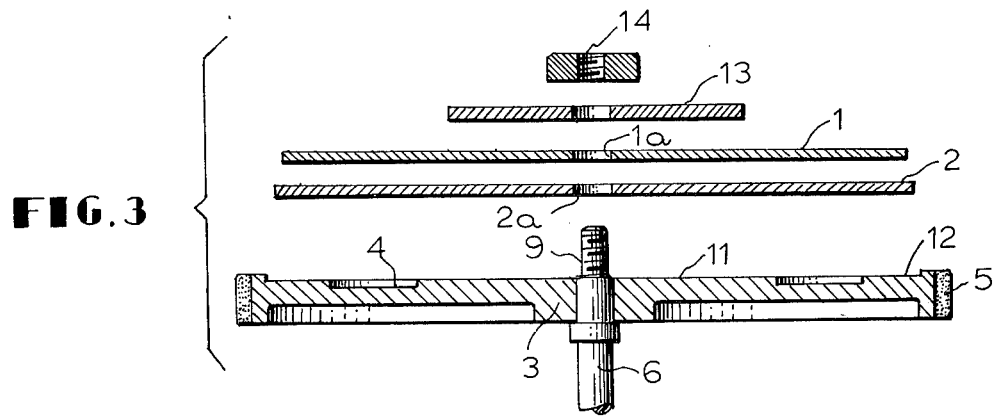
FIG. 3 is an exploded view showing the manner in which the main parts of the magnetic recording disc shown in FIG. 2 are assembled.

Referring to FIG. 3, at first the flexible sheet 2 is placed on the portions 11 and 12 of the first surface of the rotating disc 3. Then, the magnetic sheet 1 is placed on the flexible sheet 2, and then it is fixed to the center of the first surface portion 11 of the rotating disc 3, together with the flexible sheet 2 and a plate 13, by a nut 14 used as a clamp screwed onto the clamp pole 9.

The magnetic sheet 1 is in close contact with the magnetic head 30 where it lies over the second surface 4 of the rotating disc 3 due to the support and elasticity of the flexible sheet 2. Therefore, the contact of the magnetic head 30 with the magnetic sheet 1 can be kept stable, and because the elastic surface of the flexible sheet 2 is kept flat by being supported by the first surface, there is little fluctuation in the surface level of the magnetic sheet 1.

In the magnetic head assembly, the magnetic head 30 is fixed to a holding base 31 which is fixed to a holding arm 32. The holding arm 32 is fixed to a holding shaft 33 so that the magnetic head 30 can be easily removed from the magnetic sheet 1 during times it is not in operation. A head locating pin 34, which is fixed to the holding shaft 33, is engaged in the groove of a threaded shaft 35 and controls the position of the magnetic head 30. A roller 36 mounted on the threaded shaft 35 is used for manually changing the recording track position. The holding shaft 33 and the threaded shaft 35 are held by a base block 37 fixed to the deck 7.

When the signals are recorded on or reproduced from the magnetic sheet 1 rotating at a predetermined speed, a cam 38 is positioned as shown by a dashed line in FIG. 2 so that the magnetic head 30 is in contact with the magnetic sheet 1. When the rotation of the magnetic sheet 1 is stopped, the cam 38 is set in the position shown by the solid line in FIG. 2 so as to remove the magnetic head 30 from the magnetic sheet 1. Accordingly, by the structure of the magnetic recording disc and the magnetic head assembly described above, the magnetic sheet 1 is closely and stably held in contact with the magnetic head 30 along with the flat and elastic surface of the flexible sheet 2 mounted on the rotating disc 3. The contact of the magnetic sheet 1 with the magnetic head 30 is maintained well either at the high or low speeds of rotation of the magnetic sheet 1.

More particularly, during high speed rotation of the magnetic disc assembly, the magnetic sheet 1 is stretched tight by the centrifugal force and so it is closely fitted to the surface of the flexible sheet 2, so that a very flat surface is formed. On the other hand, at a low speed of rotation of the magnetic disc assembly, the contact of the magnetic head 30 with the magnetic sheet 1 is stable even if the flexible sheet 2 has some surface deflections, because the magnetic head 30 is movably mounted on the holding arm 32 so as to follow any surface deflections. Thus, either at high or low speeds of rotation of the magnetic sheet 1, the recording or reproducing of the signals is achieved without a change in the contact of the magnetic head 30 with the magnetic sheet 1.

Surface deflection of the magnetic sheet 1, which is caused by surface deflections of the flexible sheet 2, can be minimized by finishing the first surface positions 11 and 12 of the rotating disc 3 by a lathe. Further, the precise finish of the first surface results in a long life of the magnetic sheet 1. For example, each of the circular recording tracks on the magnetic sheet 1 can be used for more than 200 hours when such a finishing is carried out.

The shape of the magnetic sheet 1 is not limited to a circle. As is obvious, almost any polygonally shaped sheet may be used instead of a circular disc, substantially without affecting the operation of the disc described hereinbefore referring to FIGS. 1 and 2.

For the flexible sheet 2, a plastic film such as a polyethylene terephthalate film, or a flexible metal film such as an aluminum film may be used. In addition, a plastic base which is similar to the magnetic sheet but which has no magnetic material coated thereon can be used. It is of course possible to use the magnetic sheet itself for the flexible sheet 2.

Further, in the magnetic recording disc of the invention, the magnetic sheet can be replaced very easily with a new one, because the magnetic sheet 1 supported on the flexible sheet 2 is fixed to the rotating disc 3 only at the center thereof. Accordingly, the cost of replacing the magnetic sheet 1 is very low. Moreover, the flexible sheet 2 which forms the flexible surface for the magnetic sheet 1 can also be very easily replaced with a new one.

Figure 4:
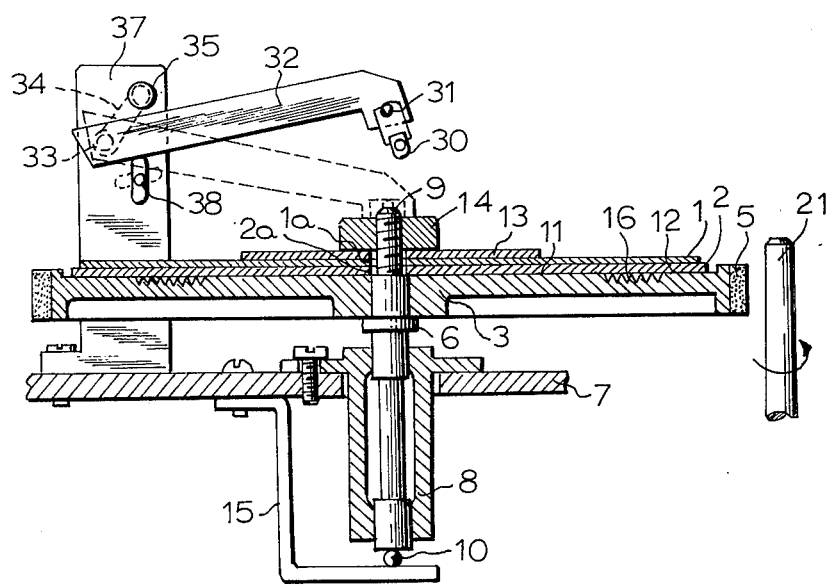
FIG. 4 is a cross-sectional view similar to FIG. 2 of another embodiment of a magnetic recording disc according to this invention.

FIG. 4 shows another embodiment of a magnetic recording disc according to this invention, wherein the second surface of the rotating disc 3 is constituted by a plurality of grooves 16 formed in the first surface, and the magnetic head 30 is in contact with the magnetic sheet 1 at each position of these grooves 16. The shape of the grooves 16 is not limited to a V-shape as shown in FIG. 4, and almost any shaped groove such as rectangular, saw-tooth or semicircular shaped groove may be used while providing substantially the same operation of the disc 3 as that described hereinbefore.

Figure 5:
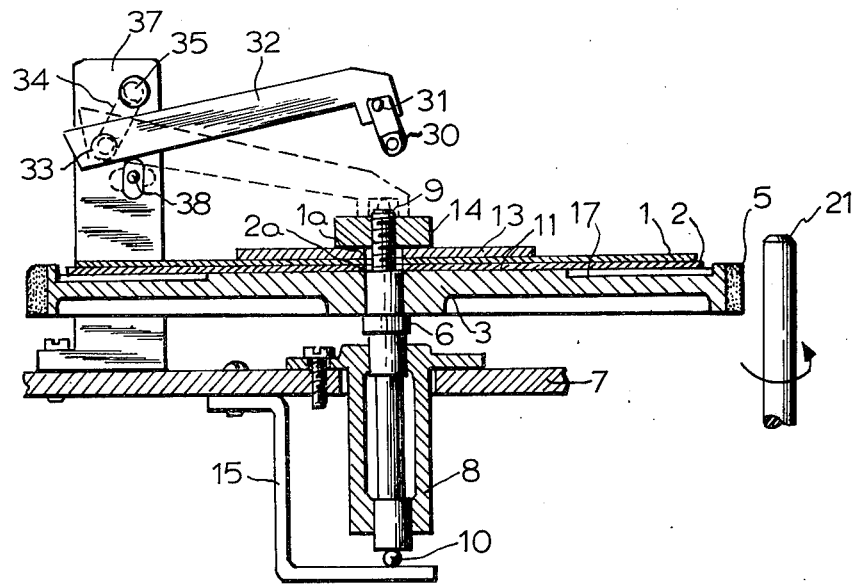
FIG. 5 is a cross-sectional view similar to FIG. 2 of still another embodiment of a magnetic recording disc according to this invention.

A further embodiment of a magnetic recording disc according to this invention is shown in FIG. 5, wherein the second surface of the rotating disc 3 is an annular groove 17 which extends from the outer edge of the first surface 11 to the periphery of the rotating disc 3, and the diameter of the rotating disc 3 is larger than that of the flexible sheet 2 mounted on the rotating disc 3. In this embodiment, the first surface is present only adjacent the center of the rotating disc 3. The periphery of the flexible sheet 2 is left free without being supported by the first surface.

Figure 6:
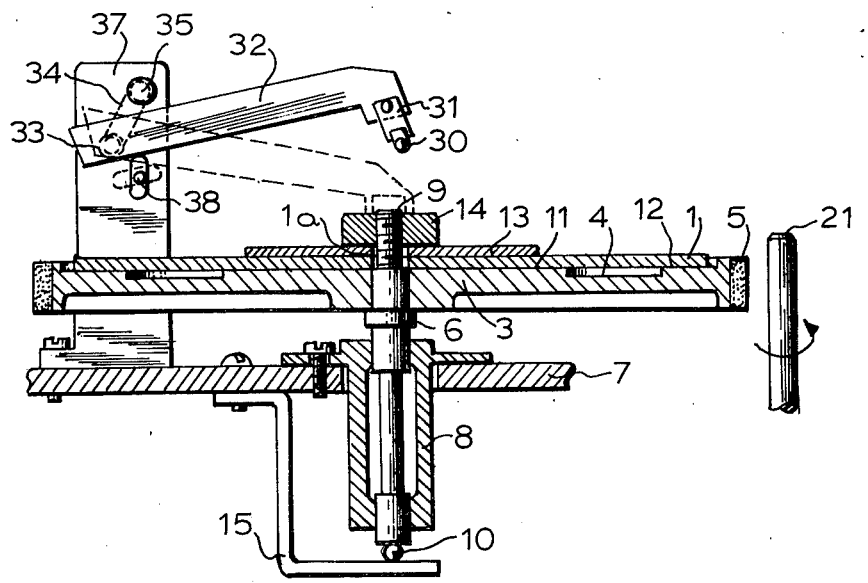
FIG. 6 is a cross-sectional view similar to FIG. 2 of a further embodiment of the magnetic recording disc according to this invention.

A still further embodiment of a magnetic recording disc according to this invention is shown in FIG. 6, wherein a plastic base, on which the magnetic material is coated for recording signals, is used for the flexible sheet 2. That is, only the magnetic sheet 1 is held on the first surface of the rotating disc 3. In this embodiment, the material of the magnetic sheet 1 is selected from the point both of elasticity required for providing the flexible surface and the magnetic recording characteristic.

It will be apparent from the foregoing that while particular forms of this invention have been illustrated and described, various modifications can be made without departing from the spirit and scope of the invention as defined by the appended claims.

What is claimed is:
1. A magnetic recording apparatus comprising:
   a rotating disc adapted to be rotated by a driving means, said rotating disc having a first surface and a second surface indented from said first surface;
   a flexible sheet mounted on said first surface of said rotating disc and extending over said first surface and above said second surface of said rotating disc;

a separate magnetic sheet readily separable from and mounted on said flexible sheet;

means attachable to said rotating disc for holding at least a part of said separate magnetic sheet together with said flexible sheet on said rotating disc over said first surface, whereby said separate magnetic sheet and said flexible sheet rotate with said rotating disc; and a magnetic head assembly for recording signals on and reproducing signals from said separate magnetic sheet, said magnetic head assembly including magnetic recording and reproducing head means positionable in close contact with said separate magnetic sheet at a position thereon above said second surface and arranged for movement in the vertical direction to follow any surface deflection of said separate magnetic sheet upon rotation thereof while maintaining close contact therewith.

2. A magnetic recording apparatus as claimed in claim 1 wherein said holding means comprises a clamp pole extending from a center of said rotating disc, and a clamp knob coupled to said clamp pole.

3. A magnetic recording apparatus as claimed in claim 1 wherein said rotating disc has a groove in said first surface of said rotating disc, the surfaces of said groove constituting said second surface.

4. A magnetic recording apparatus as claimed in claim 1 wherein said rotating disc has a plurality of grooves in said first surface thereof, the surfaces of said grooves constituting said second surface, and portions of said magnetic sheet overlying said plurality of grooves being in close contact with said magnetic recording and reproducing head means.

5. A magnetic recording apparatus as claimed in claim 1 wherein said first surface of said rotating disc is adjacent the center thereof, and said rotating disc has an annular groove extending from the outer edge of said first surface to the periphery of said rotating disc at a diameter larger than that of said flexible sheet mounted on said rotating disc, the surfaces of said annular groove constituting said second surface.

* * * * *